US012191587B2

(12) United States Patent
Stauffer et al.

(10) Patent No.: US 12,191,587 B2
(45) Date of Patent: Jan. 7, 2025

(54) CONNECTOR SHIELD WITH INTEGRATED GROUND PIERCING CONTACT

(71) Applicant: TE Connectivity Services GmbH, Schaffhausen (CH)

(72) Inventors: Kevin Stauffer, Middletown, PA (US); James Michael Raudenbush, Middletown, PA (US); John Mark Myer, Middletown, PA (US); Joshua T. Shoemaker, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 541 days.

(21) Appl. No.: 17/496,075

(22) Filed: Oct. 7, 2021

(65) Prior Publication Data

US 2023/0110836 A1 Apr. 13, 2023

(51) Int. Cl.
*H01R 12/59* (2011.01)
*H01R 12/77* (2011.01)

(52) U.S. Cl.
CPC ......... *H01R 12/594* (2013.01); *H01R 12/775* (2013.01)

(58) Field of Classification Search
CPC .. H01R 12/594; H01R 12/775; H01R 4/2407; H01R 13/6593; H01R 12/67
See application file for complete search history.

(56) References Cited

U.S. PATENT DOCUMENTS

| | | | | |
|---|---|---|---|---|
| 3,697,925 | A | 10/1972 | Henschen | |
| 4,534,608 | A * | 8/1985 | Scott | H01R 12/775 439/345 |
| 4,721,483 | A | 1/1988 | Dickie | |
| 4,758,179 | A | 7/1988 | Klein et al. | |
| 6,290,542 | B1 | 9/2001 | Kuo | |
| 6,475,024 | B1 | 11/2002 | Narui | |
| 10,077,876 | B2 * | 9/2018 | Chin | G06F 1/183 |
| 2009/0068860 | A1 * | 3/2009 | Suzuki | H01R 12/88 439/67 |
| 2020/0266565 | A1 * | 8/2020 | Shimada | H01R 12/79 |

FOREIGN PATENT DOCUMENTS

| | | | | |
|---|---|---|---|---|
| CN | 201466267 | U | * | 5/2010 |
| CN | 203205643 | U | | 9/2013 |
| CN | 202150576 | U | | 2/2021 |
| EP | 0243150 | B1 | * | 7/1992 |

OTHER PUBLICATIONS

International Search Report, International App. No PCT/IB2022/059628 International Filing Date Oct. 7, 2022.

* cited by examiner

*Primary Examiner* — Jean F Duverne

(57) ABSTRACT

A connector shield for a flat flexible cable comprises a housing defining a connector space on a first end thereof for receiving a signal cable connector, and a cable space on a second end thereof for at least partially receiving an end of the flat flexible cable. The cable space defines a width greater than that of the connector space and a height less than that of the connector space. A plurality of contact elements extend from the housing and into the cable space for electrically contacting a conductive element of the flat flexible cable.

20 Claims, 8 Drawing Sheets

CONNECTOR SHIELD WITH INTEGRATED GROUND PIERCING CONTACT

FIELD OF THE INVENTION

The present disclosure relates to shielded electrical connector assemblies, and more particularly, to connector shields for use with flat flexible cables or flat printed cables.

BACKGROUND

Flat flexible cables (FFCs), as well as similarly-configured flat printed cables (FPCs), are gaining popularity across many industries due to advantages offered over their traditional "round wire" counter parts. Flat flexible cables generally consist of one or more conductors (e.g., signal and ground conductors) embedded within a flexible strip of insulation. The conductors may be shielded within the cable by one or more embedded shielding layers, for example, metallic foil layers arranged over and/or under the conductors. In addition to having a lower profile and lighter weight, FFCs enable the implementation of large circuit pathways with significantly greater ease compared to round wire-based architectures. As a result, FFCs are being considered for many complex and/or high-volume applications, including wiring harnesses, such as those used in automotive manufacturing.

Generally, when terminating and connectorizing a signal conductor of a cable in a sensitive application, it is often desired to externally shield the resulting assembly for preventing the intrusion of electromagnetic interference (EMI). In the case of a traditional round wire and connector, a connector shield is brought into contact with a shielding layer surrounding the signal wire which has been exposed via, for example, an intervening stripping operation. In the case of an FFC, however, the fragile nature of the foil shielding layers and ground conductors, as well as their embedded position within the insulation material, increases the difficulty in establishing reliable electrical connections between these elements and a connector shield.

Accordingly, there is a need to develop quick and reliable techniques for establishing an electrical connection between a connector shield and the embedded foil shielding and/or conductors of an FFC or FPC.

SUMMARY

According to one embodiment of the present disclosure, a connector shield for an FFC or FPC comprises a housing defining a connector space on a first end thereof for housing a cable connector, and a cable space on a second end thereof for at least partially receiving an end of the FFC. The cable space comprises a width greater than that of the connector space and a height less than that of the connector space. A plurality of contact elements extend from the housing and into the cable space for electrically contacting a conductive element of the FFC.

According to another embodiment, a connector assembly comprises an FFC or FPC having a signal conductor and a shielding layer or conductor embedded in an insulation material. A shield housing of the assembly includes a lower shell, an upper shell attached to the lower shell, and a contact element extending from at least one of the upper shell or the lower shell for electrically contacting the shielding layer or conductor of the cable.

BRIEF DESCRIPTION OF THE DRAWINGS

The invention will now be described by way of example with reference to the accompanying Figures, of which.

DETAILED DESCRIPTION OF THE EMBODIMENTS

Figure 1:
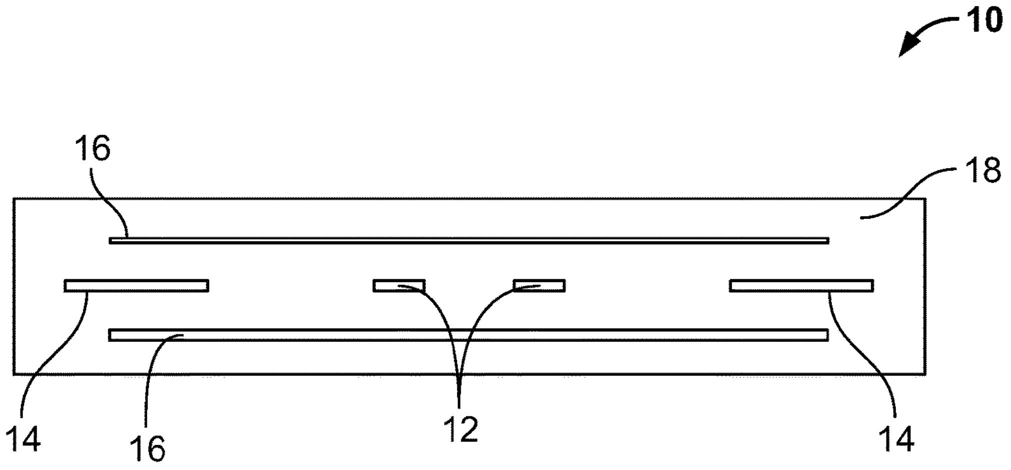
FIG. 1 is a cross-sectional view of an exemplary FFC useful for describing embodiments of the present disclosure.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Embodiments of the present disclosure include conductive connector shields or shield housings configured for use with FFCs and/or FPCs. The shield housings include integrated contact elements for establishing reliable electrical contact with shielding conductors, such as shielding foil layers and/or ground or drain conductors, embedded within the insulation material of the cable.

FIG. 1 is a cross-sectional view of an exemplary FFC 10 useful for describing shields according to embodiments of the present disclosure. The FFC 10 includes a plurality of conductors or conductive traces, for example, a pair of central signal conductors 12, also referred to herein as first conductors, bordered on either side by second conductors 14, such as ground and/or drain conductors. The representative FFC 10 further includes upper and lower shielding layers 16, for example, metallic foil shielding. The conductors 12,14 and shielding layers 16 are embedded within an insulation material 18, such as a polymer material. As set forth above, when terminating and connectorizing the signal conductors 12, it is often desirable to shield the finished connector assembly. According to embodiments of the present disclosure, this achieved via a metallic shield housing or shell that surrounds the terminated ends of the signal conductors 12, and electrically contacts the shielding layers 16 and/or the ground or drain conductors 14 of the FFC 10.

Figure 2:
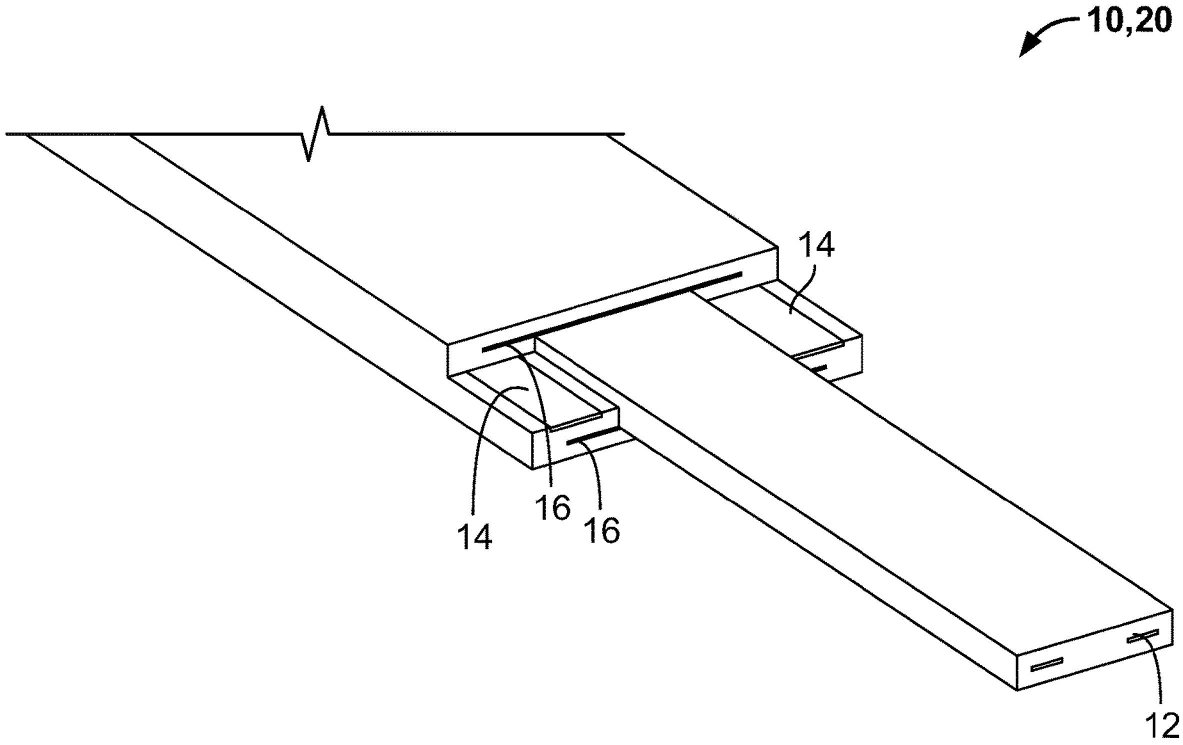
FIG. 2 is a perspective view of the FFC of FIG. 1 used with a shielding assembly according to an embodiment of the present disclosure.

Referring now to FIG. 2, advantageously, FFCs and FPCs may be manufactured with a predetermined end profile, eliminating the need for further processing steps prior to connectorization to expose the signal and/or shielding conductors thereof (e.g., stripping, as required for round-wire termination). As illustrated, a free end 20 of the exemplary FFC 10 according to an embodiment of the present disclosure has been manufactured with shortened second conductors 14 and shielding layers 16 relative to the signal conductors 12 in an axial direction of the cable. Further, top surfaces of a portion of each of the second conductors 14 are left exposed. As will be set forth in detail herein, the exemplary preconfigured end profile or free end 20 of the FFC 10 enables shield housings according to embodiments of the present disclosure to more easily and reliably establish electrical connections with the embedded shielding layers 16 and conductors 14 of the cable.

Figure 3:
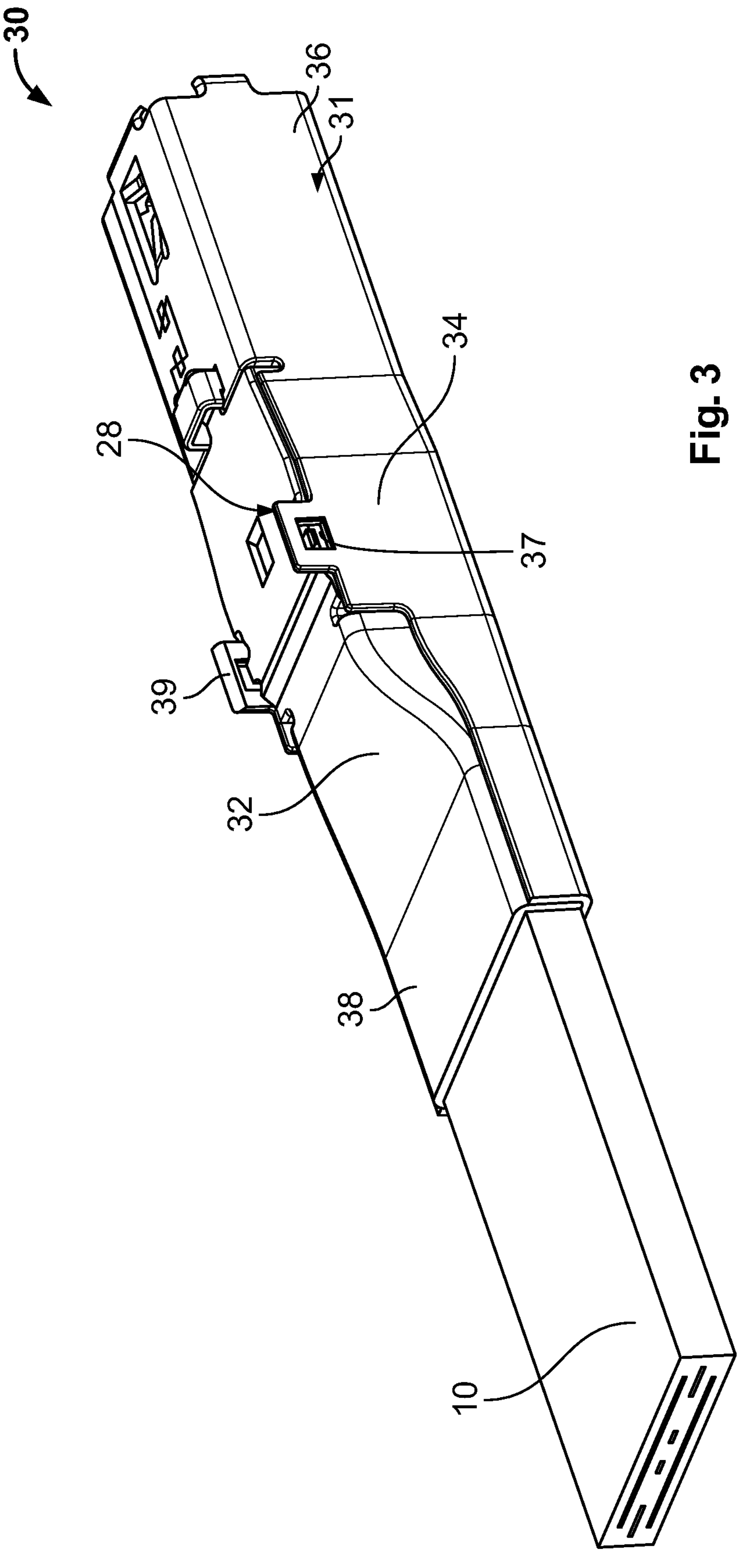
FIG. 3 is a perspective view of an assembly including the FFC of FIG. 1 and a shield housing or shell in an assembled state according to an embodiment of the present disclosure.

FIG. 3 generally shows a complete FFC assembly 30 comprising a shield or shield housing 31 including an upper housing or shell 32 joined with a lower housing or shell 34. The upper and lower housings 32,34 may comprise sheet metal components formed from stamping, folding and other similar operations. The shield housing 31 defines a connector space 36 at a first end thereof in which the signal conductors 12 of the FFC 10 are terminated and/or connectorized, and a cable space 38 at a second end thereof at least partially receiving the free end of the FFC, including the shielding layers 16 and ground conductors 14 thereof. As shown, the cable space 38 has a width greater than that of the connector space 36, and a height less than that of the connector space for receiving the correspondingly-sized FFC 10. Likewise, the connector space 36 narrows relative to the cable space 38 and increases in height in order to receive the terminals and/or a connector body fitted to the signal conductors 12.

Figure 4:
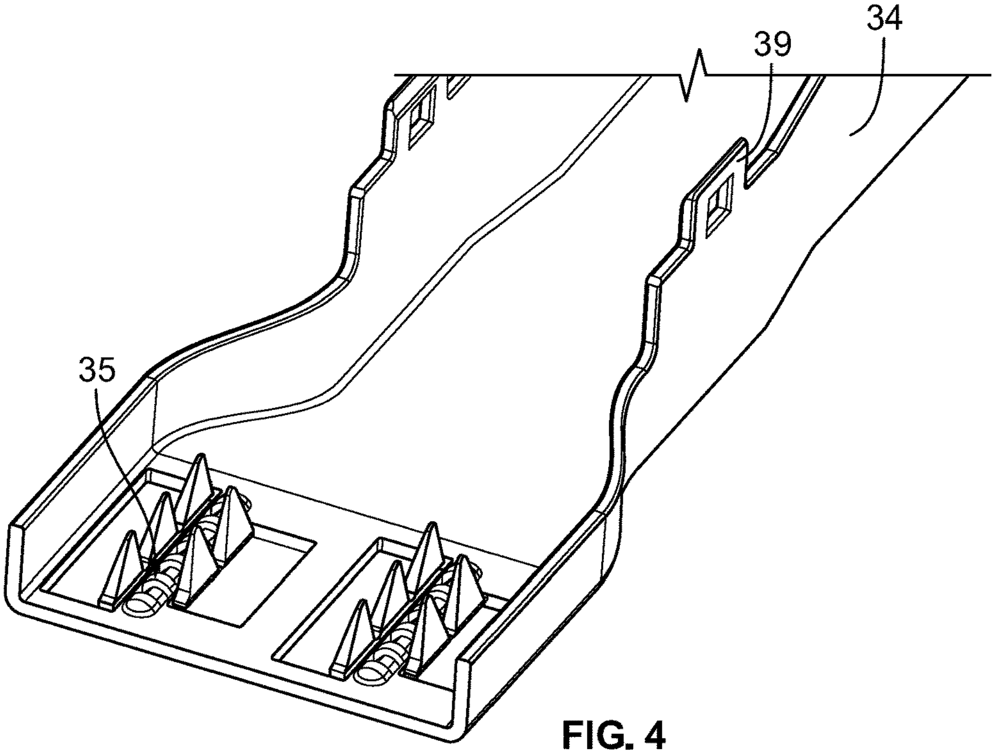
FIG. 4 is a top perspective view of a lower housing or shell according to an embodiment of the present disclosure.
Figure 5:
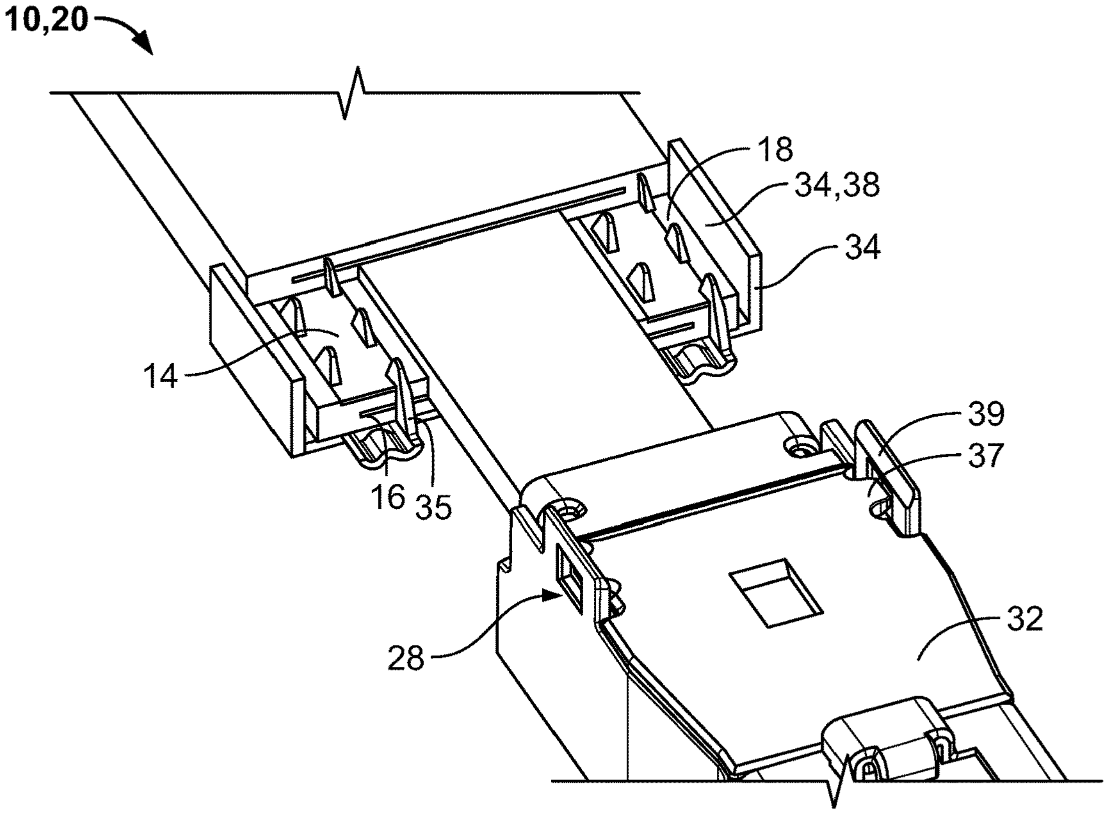
FIG. 5 is partial top perspective view of the assembly of FIG. 3 with the FFC in an attached or installed position.
Figure 6:
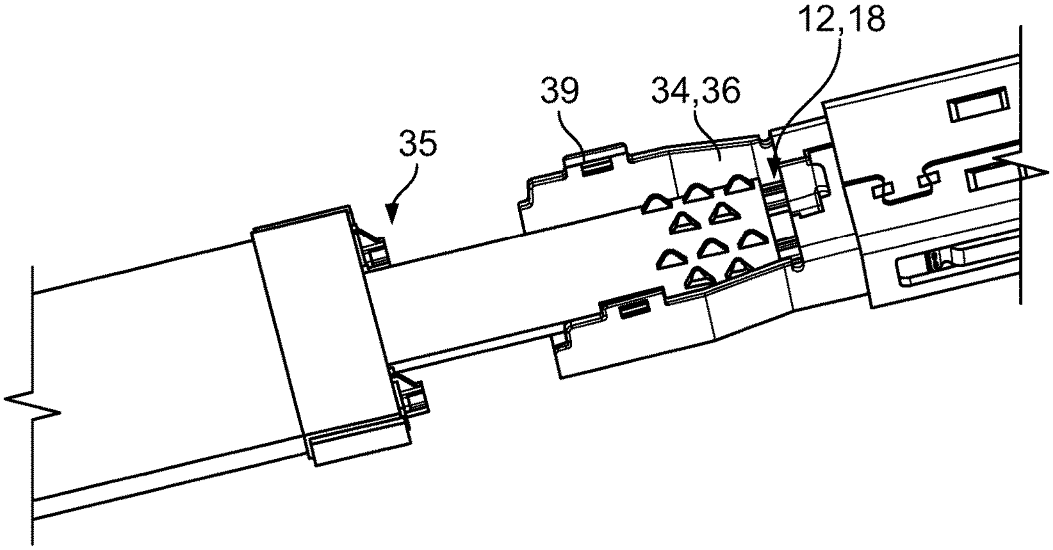
FIG. 6 is another partial top perspective view of the assembly of FIG. 3 illustrating the terminated signal conductors.

Referring now to FIGS. 4-6, according to an embodiment of the present disclosure, the lower housing or shell 34 defines a plurality of integral contact elements 35 in the form of sharpened tines or crimping features. More specifically, the contact elements 35 may define piercing, crimpable elements, or insulation-displacement contacts (IDCs), or insulation-piercing contacts (IPCs), for establishing electrical connections through the insulation material 18 of the FFC 10. In the exemplary embodiment, the contact elements 35 may be arranged in two pairs of rows, with each row defining a plurality of tines, and each pair of rows arranged offset from an axial center of lower housing shell 34. Referring to FIGS. 5 and 6, portions of the upper housing 32 and the lower housing 34 have been removed to reveal the resulting electrical connections between the contact elements 35 and the conductors 14 and lower shielding layer 16 within the cable space 38 (FIG. 5), as well as the termination of the signal conductors 12 within the connector space 36 (FIG. 6).

As illustrated in FIG. 5, the contact elements 35 are configured to penetrate the lower or bottom portion of the insulation 18, and contact or penetrate both the lower shielding layer 16 as well as each of the conductors 14 of the exemplary FFC 10. More specifically, the contact elements 35 of a given pair of rows penetrates a respective one of the conductors 14 on each side of the signal conductors 12. A central space defined between the laterally-offset contact elements 35 permits the passage of the signal conductors 12 and associated insulation material 18 therebetween. In this way, the signal conductors 12 extend uninterrupted into the connector space 36 of the housing 31,34 for termination, as shown in FIG. 6. In a subsequent processing step, the contact elements 35 may be crimped or folded into compressive contact with the insulation material 18 of the FFC 10.

Referring particularly to FIGS. 3 and 5, the upper housing 32 may be fixed to the lower housing 34 via a locking assembly 28. The locking assembly 28 comprises, by way of example, complementary snap-fit latching features, including latching protrusions or latches 37 and corresponding latch openings or catches 39. The contact elements 35 may penetrate the FFC 10 under the compressive force used to join and lock the upper and lower housings 32,34, with the mated locking assembly 28 ensuring that electrical contact between the contact elements 35, and the conductors 14 and shielding layers 16 is reliably maintained.

Figure 7:
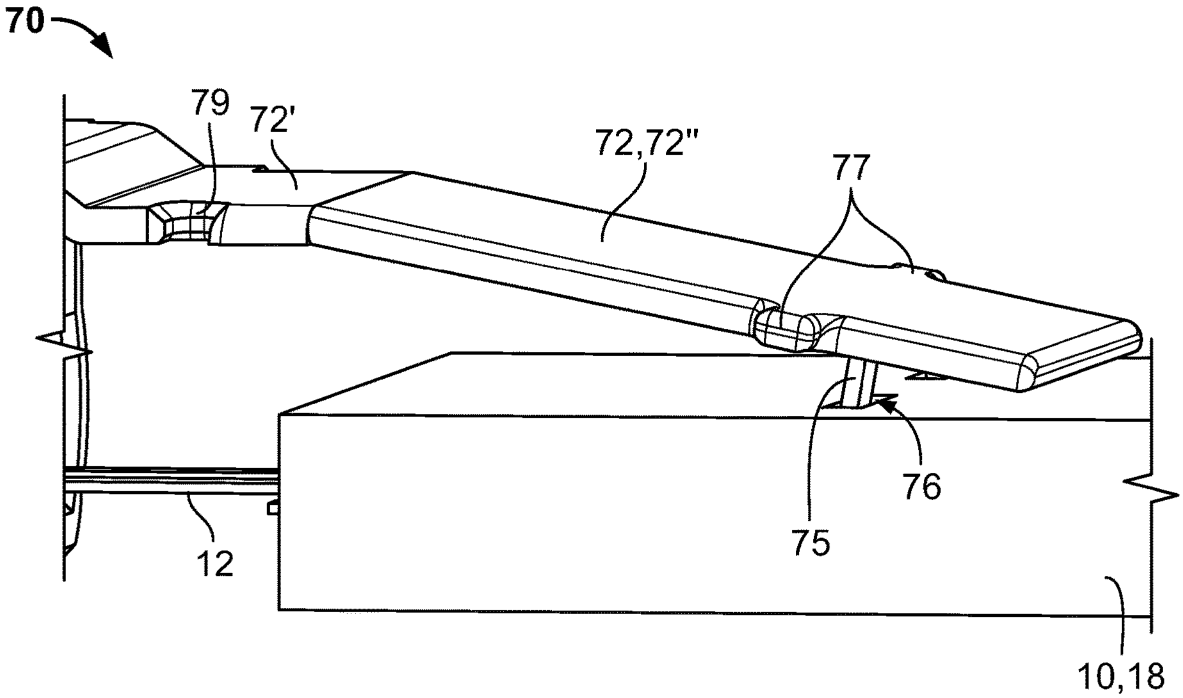
FIG. 7 is a side perspective view of an FFC and an upper housing according to another embodiment of the present disclosure.
Figure 8:
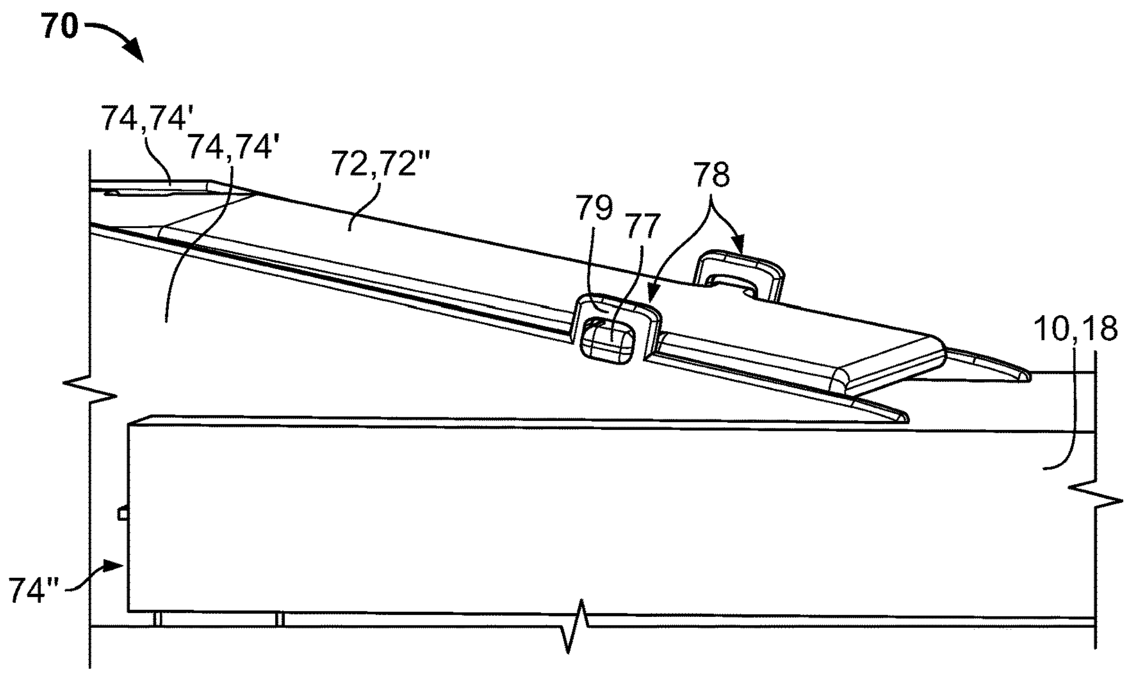
FIG. 8 is a side perspective view of the embodiment of FIG. 7 with a lower housing of the shield attached to the upper housing.

Referring now to FIGS. 7 and 8, a shield assembly 70 according to another embodiment of the present disclosure is provided. As shown in FIG. 7, in which a lower housing 74 of the shield has been removed, the FFC 10 of the assembly 70 may be manufactured with a different free end profile compared to that set forth above with respect to the preceding embodiment. More specifically, the FFC 10 includes windows or openings 76 formed therein proximate a free end for exposing the upper shielding layer 16. While the FFC 10 is shown with the openings 76 formed only through a top side of the insulation material 18, in addition to or in place of these openings, windows or openings may also be formed in a bottom side of the FFC for exposing the lower shielding layer 16, without departing from the scope of the present disclosure.

An upper housing or shell 72 of the assembly 70 includes a first top section 72' oriented generally parallel with the FFC 10 for defining the above-described connector space of the housing, and a second top section 72" extending or declining obliquely downward from the first top section and in a direction toward the FFC for defining the cable space. The second top section 72" defines one or more contact elements 75 extending therefrom. The contact elements 75 define lances or elongated projections positioned to engage the preformed openings 76 in the insulating material 18 for establishing conductive contact with the shielding layer 16 of the FFC 10. In some embodiments, the contact elements 75 may be configured to merely contact the shielding layer 16. In other embodiments, the contact elements 75 may be sized and shaped to penetrate the shielding layer 16, and may establish contact with the underlying conductors 14. In still other embodiments, the preformed openings 76 in the FFC 10 may not be present, and the upper housing 72 may establish electrical contact with the foil shield 16 via the contact elements 75 penetrating the insulation material 18 under a compressive force, such as that generated when the upper housing 72 is connected to the lower housing 74, as shown in FIG. 8.

Referring particularly to FIG. 8, the lower housing 74 comprises sidewalls 74' each having a complementary tapered or inclined profile matching that of the second top section 72". The sidewalls 74' further define a slot 74" formed therethrough and sized to accept the free end of the FFC 10. The lower housing 74 is attached to the upper housing 72 via a locking assembly 78 defining snap-fit and/or latching connections, each including a latch 77 and recess 79 similar to those as described above with respect to FIGS. 3-6. The locking assemblies 78 are located on a lower end of the second top section 72" proximate to the contact elements 75 for maintaining a tension force on the upper housing 72, ensuring reliable electrical contact between the contact elements 75 and the shielding layer 16 and/or the conductors 14 of the FFC 10. As shown in FIG. 7, a second recess 79 may be formed in the first top section 72' of the upper housing 72 for receiving another latch of the lower housing 74. In this way, shield housings according to embodiments of the present disclosure may include multiple pairs of snap-fit connections along their length in the axial direction of the FFC 10.

Figure 9:
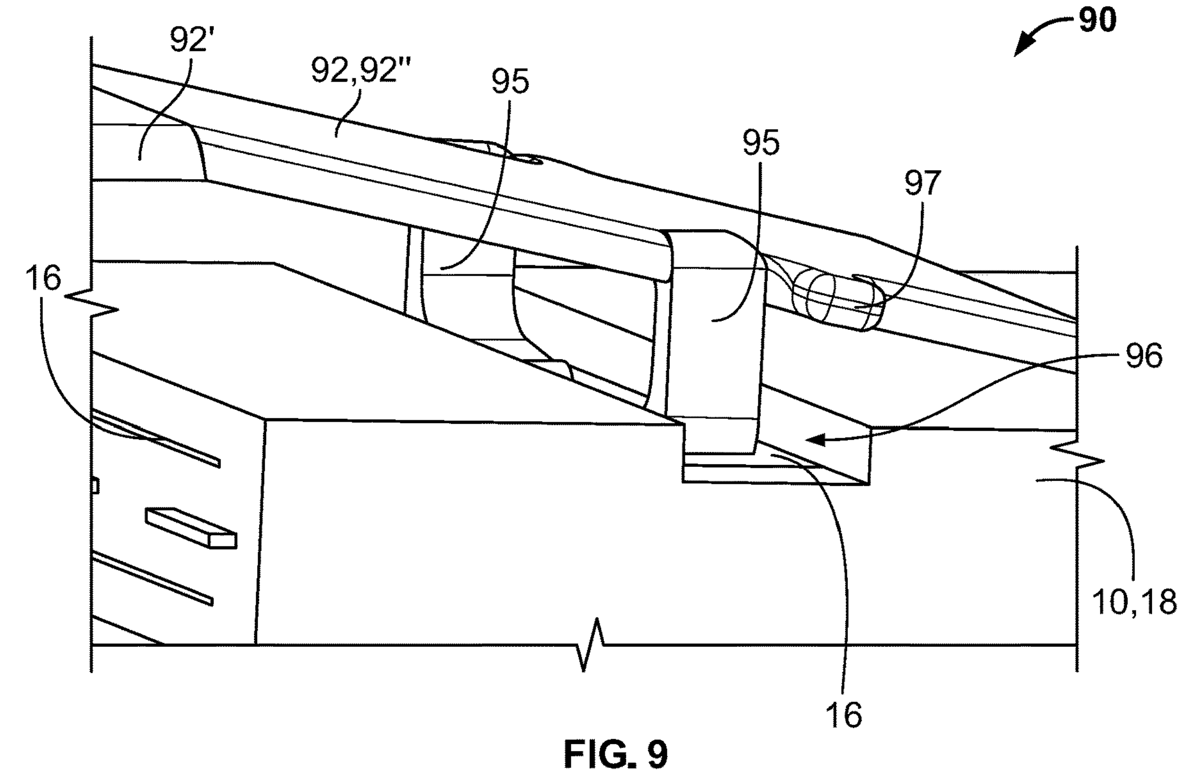
FIG. 9 is a side perspective view of an FFC and an upper housing according to another embodiment of the present disclosure.
Figure 10:
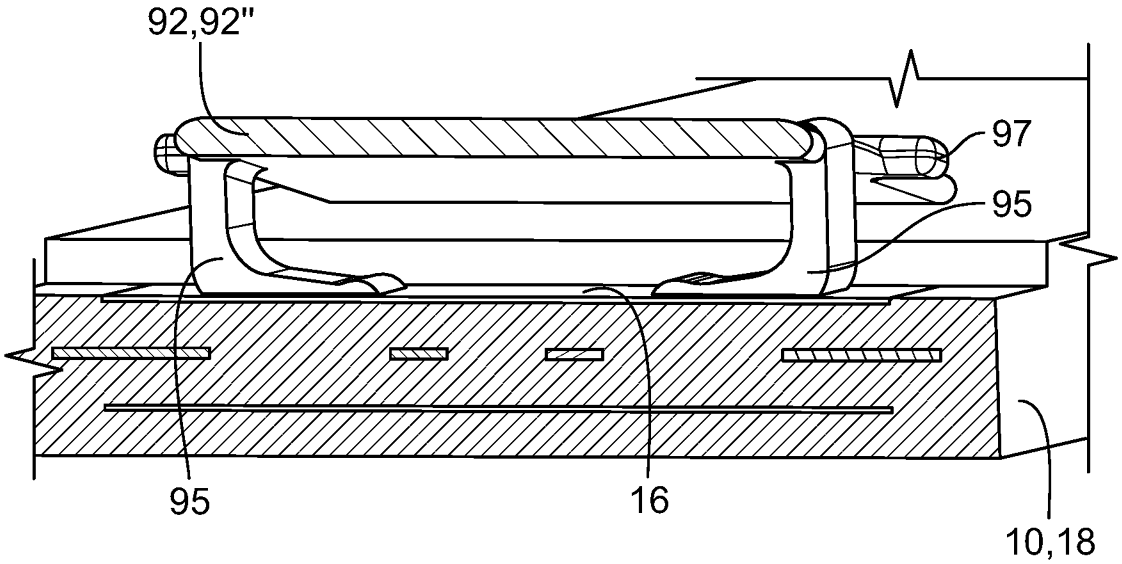
FIG. 10 is a front perspective view of the embodiment of FIG. 9.

Referring now to FIGS. 9 and 10, a shield assembly 90 according to another embodiment of the present disclosure is shown. The exemplary FFC 10 of the assembly 90 defines a slotted opening 96 formed across an entire width of the insulation material 18 for exposing the upper shielding layer 16. An upper housing 92 of the shield includes first and second top sections 92',92", similar to those described above with respect to FIGS. 7 and 8. The second top section 92" defines contact elements 95 in the form of two substantially L-shaped cantilevered arms or beams extending therefrom. More specifically, each contact element 95 extends downwardly from the second top section 92" of the upper housing 92 in the illustrated orientation, and bends or turns inwardly, defining a free end extending generally parallel with the shielding layer 16. In this way, free ends of the contact elements 95 extend toward one another and in the direction of an axial center of the FFC 10. With a lower housing fitted to the upper housing 92 (see FIG. 8), the contact elements 95 provide a normal force acting on the upper shielding layer 16 for establishing electrical contact. The elasticity provided by the cantilevered nature of the contact elements 95 ensures the contact force on the shielding layer 16 remains consistent.

Still referring to FIGS. 9 and 10, as the second top section 92" of the upper housing 92 is inclined with respect to the first top section 92' as it transitions between the cable space and the connector space, the contact elements 95 extend from the second top section 92" in an oblique orientation such that they are oriented normal to a horizontal plane defined by the shielding layer 16. Further, the contact elements 95 extend from the second top section 92" at a point directly adjacent to a latch or protrusion 97 of a locking assembly of the housing. In this way, bending is reduced on the upper housing 92 after a lower housing is fitted and the contact elements 95 are compressed onto or into the shielding layer 16.

Figure 11:
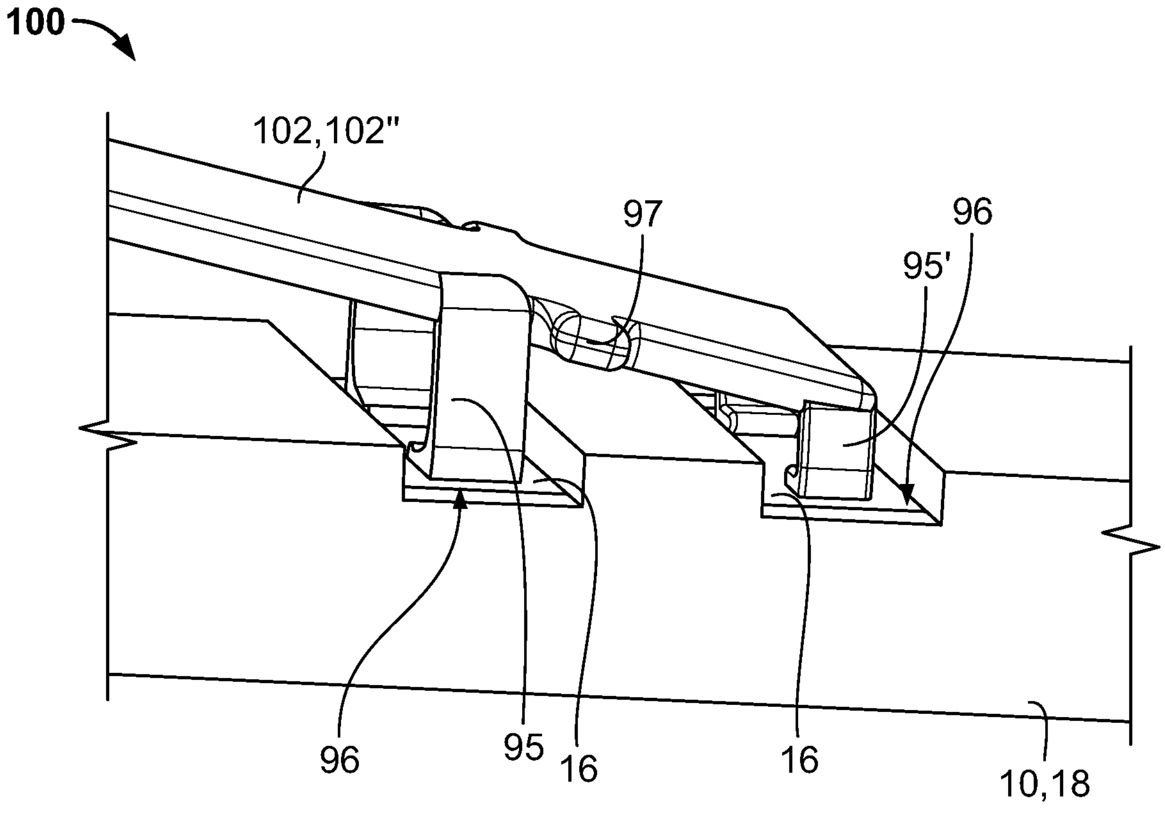
FIG. 11 is a side perspective view of an FFC and an upper housing according to another embodiment of the present disclosure.

A shield assembly 100 shown in FIG. 11 includes features similar to those described above with respect to FIGS. 9 and 10, with only the differences described further herein. In distinction to the embodiment of FIGS. 9 and 10, a declining second top section 102" of an upper housing 102 of the assembly 100 defines two pairs of beam-shaped contact elements 95,95' extending into two slotted openings 96 formed in the insulation material 18 of the FFC 10. The use of two pairs of contact elements 95,95' both increases the contact area between the shield housing and the exposed shielding layer 16, as well as more evenly distributes compression forces acting thereon. The distribution of forces is also improved by arranging each pair of contact elements 95,95' on opposite sides of the latch or protrusions 97 of the upper housing 102.

Figure 12:
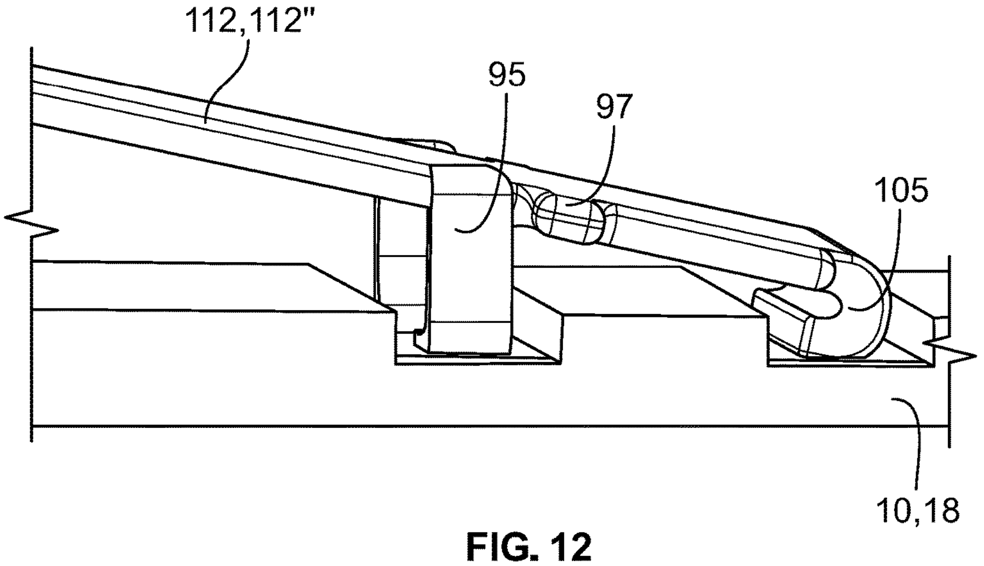
FIG. 12 is a side perspective view of an FFC and an upper housing according to another embodiment of the present disclosure.

Similarly, the embodiment of FIG. 12 includes an upper housing 112 including a second top section 112" defining a first pair of contact elements 95 or beams arranged on a first side of the latch or protrusion 97, and a substantially U-shaped rear contact element 105. The rear contact 105 is arranged on a second side of the latch or protrusion 97 and defines a curled free end extending generally in an axial direction of the FFC 10. Like the embodiment of FIG. 11, in addition to increasing the surface area of electrical contact between the shield and the cable conductors, the introduction of an additional point of contact on the shielding layer 16 by the rear contact element 105 increases stability by more evenly distributing compressive forces, as well as reducing the resulting bending forces acting on the shield.

Figure 13:
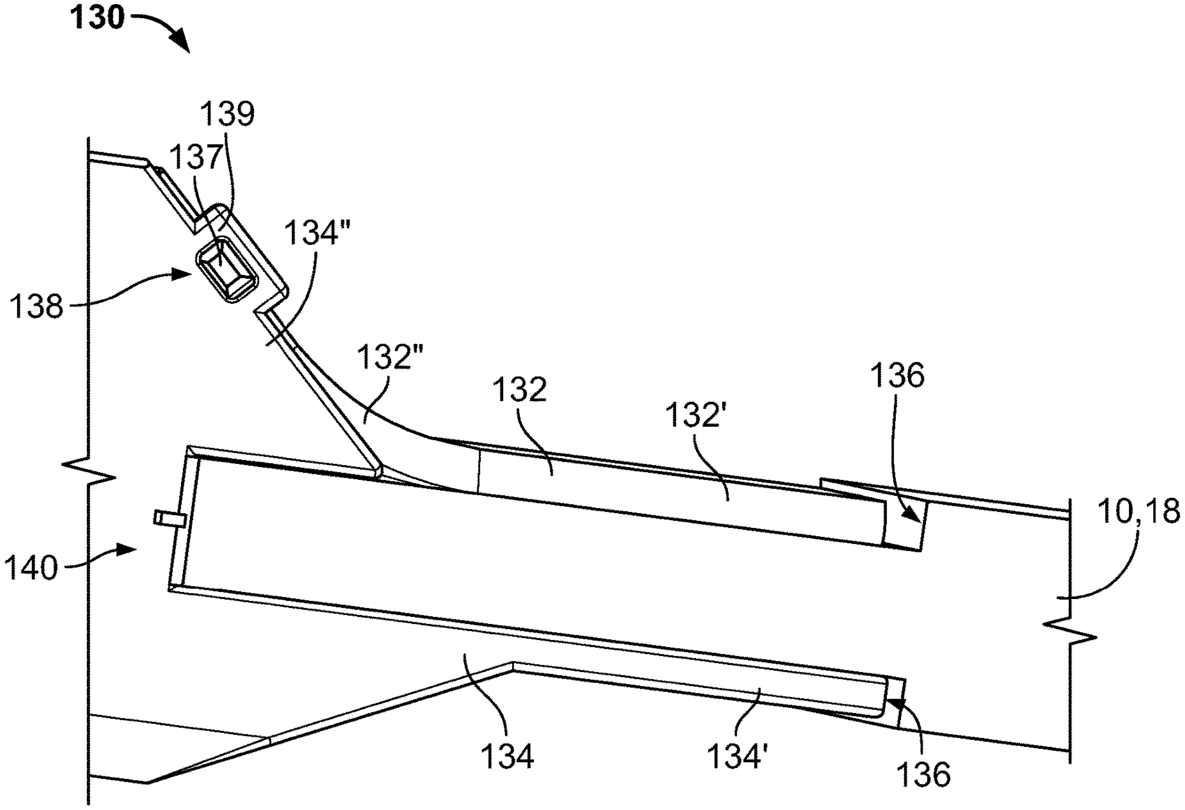
FIG. 13 is a side perspective view of an assembly including an FFC and a shield having an upper housing and a lower housing according to another embodiment of the present disclosure.
Figure 14:
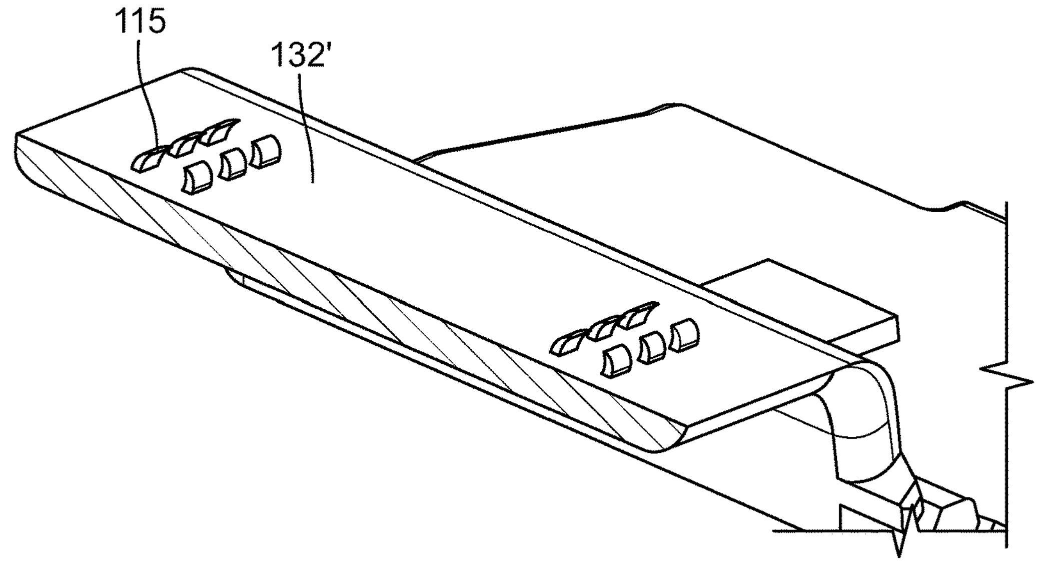
FIG. 14 is a bottom perspective view of the upper housing of FIG. 13.
Figure 15:
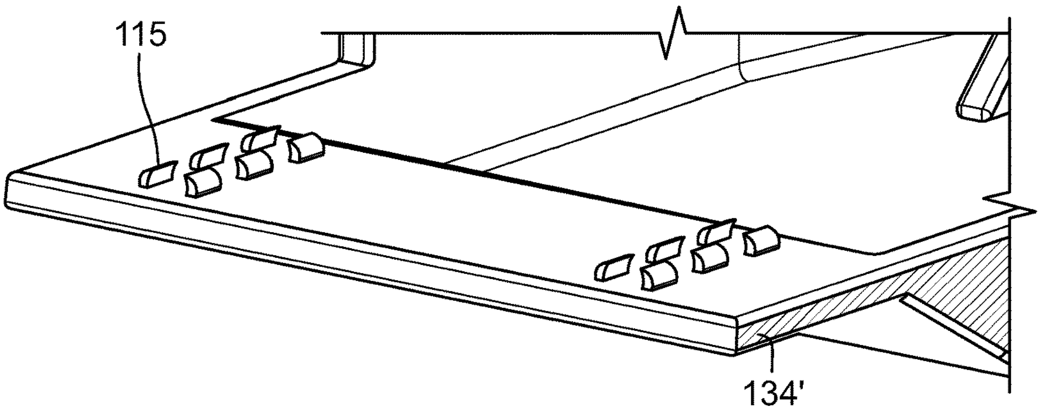
FIG. 15 is a bottom perspective view of the lower housing of FIG. 13.
Figure 16:
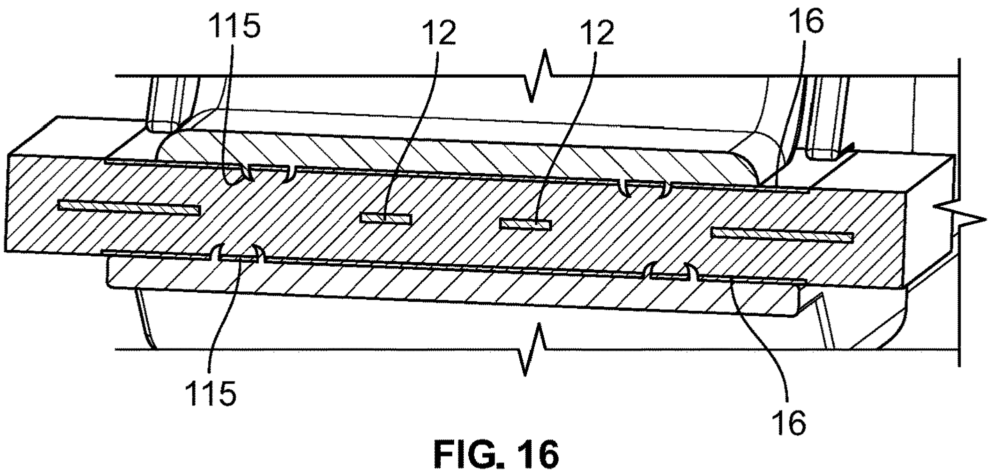
FIG. 16 is a front cross-sectional view of the assembly of FIG. 13.

FIGS. 13-16 illustrate another shield assembly 130 including upper and lower shield housings 132,134, each defining a respective flat or linear end section 132',134' extending parallel to the FFC 10. More specifically, the FFC 10 defines recessed ends 136 formed in the insulation material 18 for exposing respective top and bottom planar surfaces of the upper and lower shielding layers 16, as shown in FIGS. 13 and 16. Interior or bottom planar surfaces of the linear end sections 132',134' define contact elements 115 in the form of foil picks, as shown in FIGS. 14-16. In one embodiment, the contact elements 115 are arranged in a pair of adjacent rows, with each row having contact elements defining free ends curved in a direction opposing the curved free ends of the contact elements of the adjacent row. Two such arrangements are formed on lateral sides of both the upper and lower housings 132,134, with the signal conductors 12 of the FFC 10 extending freely therebetween. A locking assembly 138, including latches 137 and associated recesses 139, is formed on respective inclined sections 132",134" of the upper and lower housings 132,134 which extend obliquely from the linear end sections 132',134' and toward a connector space of the assembled housing. Like the embodiment of FIG. 8, the lower housing 134 further defines a slot 140 formed therethrough (i.e., through each sidewall thereof) which is sized to receive a free end of the FFC 10 therein in the illustrated manner.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A connector shield for a flat flexible cable, comprising:

a housing defining a connector space on a first end thereof for receiving a signal cable connector, and a cable space on a second end thereof for at least partially receiving an end of the flat flexible cable, the cable space having a width greater than that of the connector space and a height less than that of the connector space; and a contact element formed integrally with the housing and extending into the cable space from the housing for electrically contacting a conductive element of the flat flexible cable, the conductive element of the flat flexible cable includes at least one of a foil shielding layer or a ground conductor embedded in an insulation material, the contact element adapted to pierce the insulation material for directly contacting at least one of the foil shielding layer or the ground conductor.

2. The connector shield of claim 1, wherein the housing includes an upper housing and a lower housing attachable to the upper housing, the upper housing and the lower housing defining corresponding locking features for selectively fixing the upper housing to the lower housing.

3. The connector shield of claim 2, wherein the contact element includes sharpened foil picks extending from the upper housing and from the lower housing into the cable space.

4. The connector shield of claim 1, wherein the contact element includes sharpened crimpable tines extending from a bottom of the housing into the cable space.

5. The connector shield of claim 4, wherein the sharpened tines are arranged in rows on lateral sides of a bottom of the housing and define a central space therebetween for enabling the passage of signal conductors of the flat flexible cable into the cable space.

6. A connector shield for a flat flexible cable, comprising:

a housing defining a connector space on a first end thereof for receiving a signal cable connector, and a cable space on a second end thereof for at least partially receiving an end of the flat flexible cable, the cable space having a width greater than that of the connector space and a height less than that of the connector space; and a contact element extending into the cable space from the housing for electrically contacting a conductive element of the flat flexible cable, the contact element includes a first pair of opposing substantially L-shaped cantilevered beams having free ends extending in a direction generally parallel to a width direction of the housing.

7. The connector shield of claim 6, wherein the contact element further includes a second pair of opposing substantially L-shaped cantilevered beams having free ends extending in the direction generally parallel to the width direction of the shield housing.

8. The connector shield of claim 7, wherein:

the housing includes an upper housing and a lower housing attachable to the upper housing, the upper housing and the lower housing defining corresponding locking features for selectively fixing the upper housing to the lower housing; and the first pair of opposing substantially L-shaped cantilevered beams are arranged on a first side of the locking features in a longitudinal direction of the housing and the second pair of opposing substantially L-shaped cantilevered beams are arranged on a second side of the locking features opposite the first side.

9. The connector shield of claim 6, wherein the contact element further includes a generally U-shaped cantilevered arm extending from a rear of the housing and having a free end extending toward the connector space.

10. The connector shield of claim 6, wherein the first pair of opposing substantially L-shaped cantilevered beams are formed integrally with the housing.

11. A connector shield assembly, comprising:

a flat flexible cable having a signal conductor and a shielding conductor embedded in an insulation material; and a shield housing including:

an upper shell;

a lower shell attached to the upper shell; and a contact element extending from and formed with at least one of the upper shell or the lower shell and electrically contacting the shielding conductor of the flat flexible cable through the insulation material.

12. The connector shield assembly of claim 11, wherein the shielding conductor is exposed in at least one opening formed through the insulation material of the flat flexible cable, the contact element contacting the shielding conductor through the at least one opening.

13. The connector shield assembly of claim 12, wherein the contact element comprises a first pair of opposing substantially L-shaped cantilevered beams having free ends extending in a direction generally orthogonal to an axial direction of the flat flexible cable.

14. The connector shield assembly of claim 11, wherein the shield housing further comprises a locking assembly for securing the lower shell to the upper shell.

15. The connector shield assembly of claim 14, wherein the contact element comprises a first contact element arranged on a first side of the locking assembly in an axial direction of the flat flexible cable, and a second contact element arranged on a second side of the locking assembly opposite the first side.

16. The connector shield assembly of claim 11, wherein the signal conductor extends into the shield housing a distance greater than that of the shielding conductor in an axial direction of the flat flexible cable.

17. The connector shield assembly of claim 11, wherein the contact element includes sharpened foil picks extending toward the cable space and into the insulation material from the upper shell and from the lower shell.

18. The connector shield assembly of claim 11, wherein the contact element includes a plurality of sharpened tines crimped to the flat flexible cable.

19. The connector shield assembly of claim 18, wherein the sharpened tines electrically contact a ground conductor and the shielding conductor of the flat flexible cable.

20. The connector shield assembly of claim 19, wherein the sharpened tines are arranged in rows defined on the lower shell, the rows of tines defining a central space therebetween for receiving the signal conductor of the flat flexible cable.

* * * * *